Patented Sept. 16, 1924.

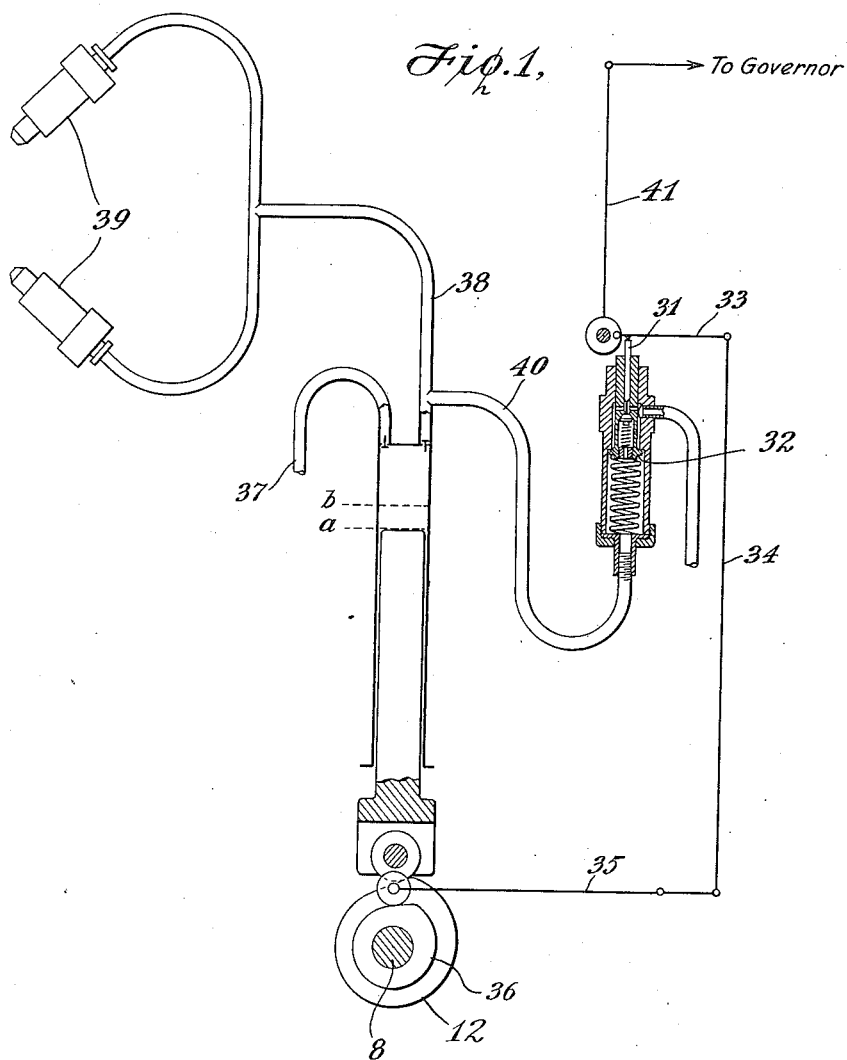

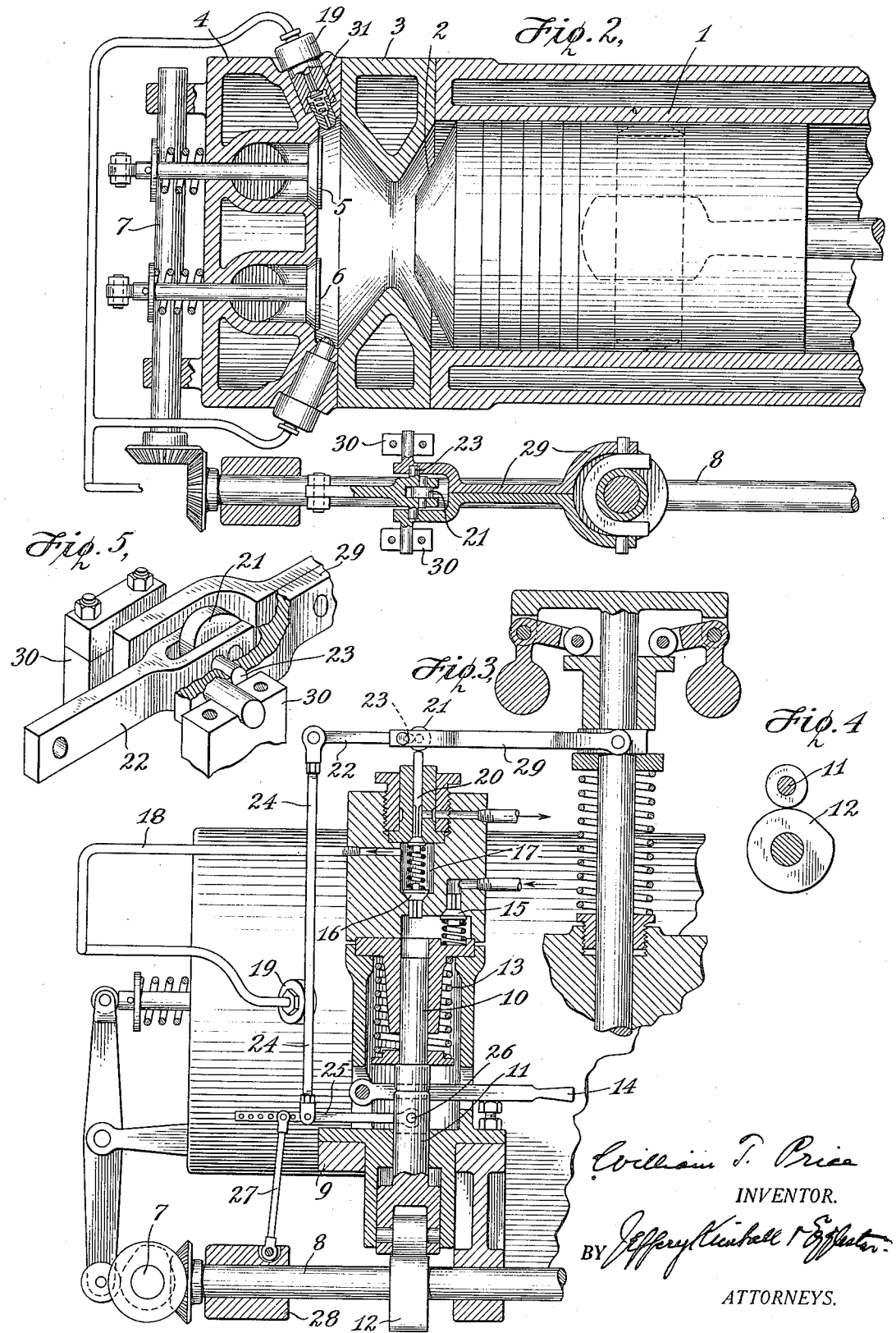

1,508,722

UNITED STATES PATENT OFFICE.

WILLIAM T. PRICE, OF EASTON, PENNSYLVANIA; HELEN C. PRICE, ADMINISTRATRIX OF SAID WILLIAM T. PRICE, DECEASED, ASSIGNOR TO PRICE ENGINE CORPORATION, OF NEW YORK, N. Y., A CORPORATION OF NEW YORK.

ENGINE-FUEL REGULATION.

Application filed December 31, 1919, Serial No. 348,703. Renewed May 15, 1923.

*To all whom it may concern:*

Be it known that I, WILLIAM T. PRICE, a citizen of the United States, of Easton, Pennsylvania, have invented the following described Improvements in Engine-Fuel Regulation.

The invention concerns the method and means for regulating the fuel charge in injection type engines wherein the fuel is sprayed into the compression space by a pump or without the use of high pressure injection air, and is more particularly concerned with that system of fuel regulation in which the amount of liquid fuel charge injected on each engine cycle is regulated by the variable operation of an escape or overflow valve connected to the delivery side of the fuel pump and opened at a certain variable time in each pumping stroke so that the amount of the injected charge is thus equal to the stroke volume of the pump less the amount permitted to escape through said valve.

This invention consists in an organization of the controlling gearing for such an escape or overflow valve, or both, so that not only the time of its opening may be varied, as stated, in the normal regulation of the engine, but also so that for all regulations the rate of escape of superfluous fuel through the valve shall take place in a certain prescribed relation to the speed and load of the engine, and I have ascertained that by observing certain limits in respect to the rate of escape, a high degree of engine efficiency may be obtained not only for a particular condition of load and speed but also throughout practically the entire range of which the engine is capable; in other words, that the engine may thus be made to operate with substantially perfect combustion, evidenced by cleanliness of the exhaust under widely different conditions of speed and load.

In the drawing,

Fig. 1 is a diagram of the fuel injecting system for an engine such as described in my copending application Serial No. 206,425, filed December 10, 1917.

Fig. 2 is an axial section through the cylinder of such an engine.

Fig. 3 is an elevation thereof, showing the fuel pump and governor in section.

Fig. 4 is a detail of the pump cam and its follower, and

Fig. 5 the shifting fulcrum arrangement of the governor lever.

Referring first to Figs. 2 to 5, the cylinder 1, piston 2, cylinder head 3, 4, exhaust and inlet valves 5 and 6, valve cam shaft 7, and lay shaft 8, will be recognized without description, it being understood that shaft 8 is geared to the engine crank shaft, not shown, and driven by it.

The fuel injection pump (Fig. 3) is mounted on a bracket 9, and its pump plunger 10 is operated through the cam follower 11, by the pump cam 12, which is fixed on shaft 8. A spring 13 performs the suction stroke of the pump plunger and keeps the follower against the cam. A hand lever 14 is also shown, engaging the plunger, whereby the latter may be hand-operated when required. The pump draws in liquid fuel through its inlet valve 15 and discharges it through the outlet valve 16, into chamber 17, whence it flows by piping 18 to one or more injectors or spray nozzles 19, set in the cylinder. This discharge takes place under high pressure suitable for producing a finely atomized spraying effect in the combustion space. The escape valve 20 which controls the amount of fuel thus discharged by the pump, is mounted in a threaded bushing closing one end of the delivery chamber 17 and held seated by the same spring which seats the outlet valve 16. The stem of the escape valve extends through the bushing and its end is engaged by a roller 21 (see Fig. 5) carried by a lever 22 which is fulcrumed at 23 and operated by a push rod 24, the latter being connected to a lever 25. This lever 25 is connected at 26 to the plunger or follower so that it moves in synchronism therewith. The fulcrum of this lever is furnished by a pivoted strut 27 supported on a frame bracket 28. The end of the lever 25 is provided with different fulcrum connections for the strut 27, as indicated, in order to provide variation and adjustment of the connections when necessary. Through said connections the lever 22 is swung in the direction to engage and open the escape valve 20, as the pump plunger makes its discharge stroke, but the time of such engagement is controlled by the position of the axis or fulcrum 23 of the said lever and said fulcrum is carried by the governor lever 29, itself fulcrumed on the fixed support 30 (Fig. 5) so that its position in relation to the valve is variable according to the condition of the governor, which latter thus controls the time of engagement of the roller 21 with the valve, as well as the extent of the valve opening. Under full or heavy load the governor lever will hold the fulcrum 23 in such relation to the valve 20 as that the roller 21 will engage and open the valve only at the latter end of the pump stroke; at light loads it will hold it so that the roller engages and opens the valve relatively early in the pump stroke, and for intermediate loads intermediate positions will be automatically established.

The general principle of shifting a lever fulcrum either by governor or by hand to control the timing of fuel pump valves, is already well known and no novelty is herein claimed thereon or on the general design of the pump or governor, both of which may be organized in different ways, as desired. The cycle of the engine may be assumed to involve the compression of an air charge to about 300 pounds more or less, and the injection of the fuel thereinto well in advance of compression dead center, say about 38 degrees measured on the crank angle and all of the fuel is delivered into the compressed air before dead center has been reached, except under conditions of overload or heavy load. Ignition occurs in such an engine as the result of compression of the mixture thus formed. The injector nozzle or nozzles of such an engine are desirably provided with check valves opening to the forward fuel flow but closing against the back pressure produced in the combustion space. In the particular engine shown, with which this invention has special coaction, there are two such nozzles oppositely arranged to direct their sprays counter to each other and somewhat toward the restricted opening which connects the compression and piston spaces. Such an engine is fully described in the application above mentioned, wherein the same system of fuel charge control is also shown.

With respect to such system this invention resides in the mode of operation of the means which open the escape valve 20 after the roller 21 has made contact therewith; that is to say, in the manner of venting the fuel in the delivery pipe of the pump in order to terminate the injection period. The aggregate of the ratios of the arms 22 and 25 is so arranged in relation to the stroke of the plunger 10, that the cross area of the flow path opened by the escape valve varies in a certain proportion to the plunger's movement after the plunger has reached the point where fuel injection is to cease. In a general way it may be stated that the cross-area is enlarged so rapidly as to cause the blast from the fuel nozzle to stop promptly and without dribbling, but not so rapidly or to such an extent as to permit the back pressure—explosion pressure—in the cylinder to press the fuel backwardly into the fuel pipe, or to permit the entrance or occurrence of gas in the nozzle or fuel line. If this happens the next following injection or injections may be partly constituted of the gas in the line, and the operation of the engine becomes uneven and unsatisfactory.

The appropriate rate of variation of the cross-area of the escape path which will avoid both these defects, can be most simply stated with reference to the further movement of the pump plunger immediately following the point when the venting of the fuel through the overflow begins, and such movement can be most conveniently referred to in terms of the cubical displacement of the plunger after that point has been reached. The value of this displacement of course becomes greater as the plunger advances and its rate of change naturally varies according to the shape of the pump cam and the speed of the engine. According to this invention—for any given value of said displacement, the cross-area of the overflow, measured in square inches, is less than the said displacement, measured in cubic inches, divided by 1, and greater than said displacement, divided by 150, and the best results are obtained when it is less than the displacement divided by 5 and more than the displacement divided by 50. This relation can be easily established by computing the size of the overflow valve and selecting the proper ratios for the lever or other mechanism by which that valve is opened.

The diagram of Fig. 1 shows the same type of fuel charge control. The escape valve 31, in this case mounted within a larger emergency valve 32, as in my prior application, is opened by lever 33, link 34, lever 35 and cam 36, which latter rotates with or in phase with the pump shaft 8. The suction pipe 37, delivery pipe 38, fuel nozzles 39 and overflow pipe 40, are arranged as in Figs. 2 and 3, and the lever 33 is fulcrumed eccentrically on the hub of a governor or hand-controlled lever 41, with the same mode of operation as above described. Let it be assumed that the escape valve has started to open when the plunger reaches point $a$, and that point $b$ represents any point in the further travel of the plunger beyond said end point $a$. According to this invention and within the preferred limits above stated, the valve 31, levers 33 and 35 and cam 36 are so designed that if the volume $a$, $b$, is say .05 cubic inches, the cross area of the opened escape valve when the plunger reaches point $b$, is between .01 (.05 divided by 5) and .001 (.05 divided by 50) square inches, and when the displacement $a\ b$, has increased to .075 cubic inches, then the cross area opened by the escape valve is likewise increased to between .015 and .0015 square inches, and so on. The escape valve operating mechanism of Figs. 2 and 3 gives proportions within these limits, or can be made to give them by the adjustments provided. It is generally sufficient if this rule of proportional change of escape area be adhered to during from five to twenty degrees of crank angle following the point where the escape or overflow valve begins to open, but this may be required to be increased under special conditions, if, for example, smoke is observed in the exhaust.

It will now be apparent that the specific mechanism whereof the escape area is controlled in relation to the pump is capable of unlimited changes of design and mode of operation and consequently that there is no limitation herein to any specific combination of levers and cams for that purpose.

I claim:

1. A fuel regulating system for airless injection type engines, comprising a fuel pump with an overflow valve variably opened during the latter part of the discharge stroke of the pump plunger, and means for controlling the cross area of said path so that for any position of the plunger beyond the point representing the end of the injection period, said cross area in square inches is less than the displacement volume in cubic inches of the plunger measured from said point and divided by 1 and greater than said volume divided by 150.

2. A fuel regulating system for injection type engines, comprising a fuel pump with an overflow valve variably opened during the discharge stroke of the pump plunger, and means for controlling the cross area of said path so that for any position of the plunger beyond the point representing the end of the injection period, said cross area in square inches is less than the displacement volume in cubic inches of the plunger measured from said point and divided by 5.

3. A fuel regulating system for injection type engines, comprising a fuel pump with an overflow path variably opened during the discharge stroke of the pump plunger, and means for controlling the cross area of said path so that for any position of the plunger beyond the point representing the end of the injection period, said cross area in square inches is less than the displacement volume in cubic inches of the plunger measured from said point and divided by 1.

4. A fuel regulating system for airless injection type engines, comprising a fuel pump with an overflow valve variably opened during the latter part of the discharge stroke of the pump plunger, and means for controlling the cross area of said path so that for any position of the plunger beyond the point representing the end of the injection period, said cross area is less than the displacement volume of the plunger measured from said point and divided by 5, and greater than said volume divided by 50.

5. The method of regulating fuel injection or airless injection engines of the type using a fuel pump with a variably opened overflow which consists in opening said overflow toward the latter part of the pump stroke so that its cross area is maintained within the following limits immediately after the point where overflow begins, viz., a minimum area represented by the stroke volume of the pump plunger measured from said end point and divided by 150, and a maximum area represented by said volume divided by 1.

6. The method of regulating fuel injection of airless injection engines of the type using a fuel pump with a variably opened overflow, which consists in opening said overflow toward the latter part of the pump stroke so that its cross area is maintained within the following limits immediately after the point where overflow begins, viz., a minimum area represented by the stroke volume of the pump plunger measured from said end point and divided by 50, and a maximum area represented by said volume divided by 1.

In testimony whereof, I have signed this specification.

WILLIAM T. PRICE.